(12) United States Patent
Lin

(10) Patent No.: US 8,266,772 B2
(45) Date of Patent: Sep. 18, 2012

(54) CONNECTOR AND METHODS OF USING A CONNECTOR

(75) Inventor: Wei-Chung Lin, Birmingham, AL (US)

(73) Assignee: MacLean Power, L.L.C., York, SC (US)

( * ) Notice: Subject to any disclaimer, the term of this patent is extended or adjusted under 35 U.S.C. 154(b) by 850 days.

(21) Appl. No.: 12/194,835

(22) Filed: Aug. 20, 2008

(65) Prior Publication Data

US 2010/0047006 A1    Feb. 25, 2010

(51) Int. Cl.
*F16G 11/00*    (2006.01)
(52) U.S. Cl. ..................................... 24/129 R
(58) Field of Classification Search .............. 24/129 R, 24/130; 52/223.13, 148, 146, 166; 14/22; 403/209; 174/40 CC
See application file for complete search history.

(56) References Cited

U.S. PATENT DOCUMENTS

| | | | |
|---|---|---|---|
| 1,293,383 A * | 2/1919 | Eaton | 403/43 |
| 2,174,192 A * | 9/1939 | Meighan | 24/129 R |
| 4,174,595 A * | 11/1979 | Watson | 52/166 |
| 5,809,618 A * | 9/1998 | Perhacs | 24/71.1 |

* cited by examiner

Primary Examiner — James Brittain
(74) Attorney, Agent, or Firm — Brinks Hofer Gilson & Lione

(57) ABSTRACT

Embodiments disclosed herein provide a connector and a method of using a connector. A connector for joining a cable with an anchor comprises a first end, a second end and a spacer extending between the first end and the second end. An opening is disposed at the first end. The opening has a configuration that mirrors a configuration of the anchor. A guying portion for joining the cable to the connector is disposed at the second end. An extension is disposed adjacent the spacer for facilitating juncture of the cable and the connector. In a method, the anchor is applied to a support surface and the first end and the anchor are joined. A tool that moves the cable in proximity to the guying portion is connected with the extension. The tool is activated to bring the cable closer to the guying portion. A portion of the cable is inserted into the guying portion for joining the cable to the connector. A further connector comprises a first end and a second end. A guying portion for joining a cable to the connector is disposed at the second end. An extension is disposed substantially between the first end and the second end for facilitating juncture of the cable and the connector. In each embodiments the connector is a single, unitary piece.

6 Claims, 2 Drawing Sheets

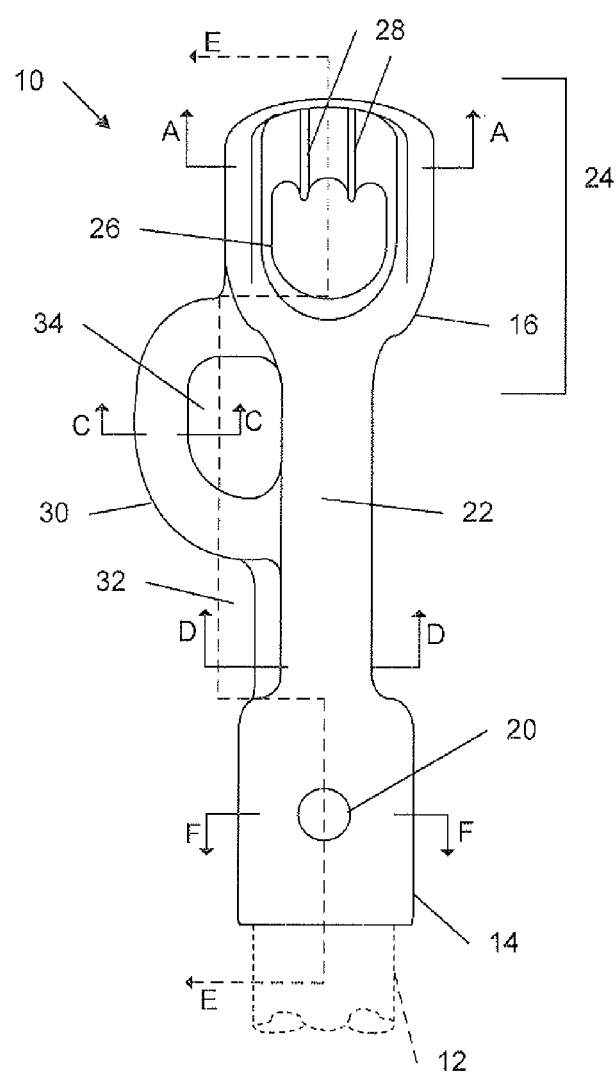
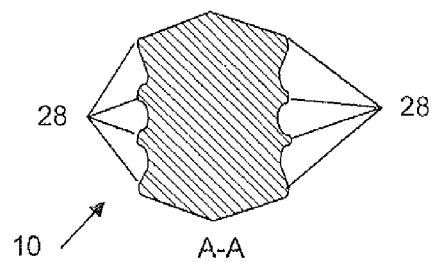
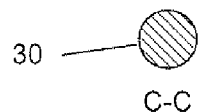
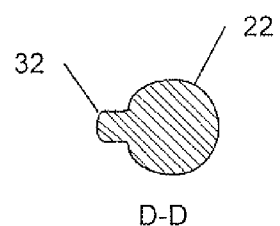

CONNECTOR AND METHODS OF USING A CONNECTOR

BACKGROUND

Embodiments described herein relate to a connector and to methods of using a connector.

In some applications, connectors are used to join one item to another. In one use, an extension joins a cable to an anchor. In this use, an anchor is attached to a work piece, such as the ground or other suitable support surface. An extension is added to the anchor. A coupling is added to the extension. One end of a tool is attached to the coupling and another end of the tool is attached to a cable. The tool is used to bring a portion of the cable in close proximity with the extension. Once the cable is sufficiently close to the extension, the cable is joined to the extension.

It is believed that currently available extensions and couplings are separate pieces joined together by a bolt and a nut, comprising a two-piece arrangement. This two-piece arrangement may be complicated to assemble. Further, the bolt and nut joint may fail. While this arrangement may be effective, it is desirable to improve and to simplify this two-piece arrangement and its operation.

SUMMARY

Embodiments described herein include connectors and methods of using a connector. According to one embodiment, a connector for joining a cable with an anchor comprises a first end, a second end and a spacer extending between the first end and the second end. An opening is disposed at the first end. The opening has a configuration that mirrors a configuration of the anchor. Means for joining the cable to the connector is disposed at the second end. An extension is disposed adjacent the spacer for facilitating juncture of the cable and the connector.

Another embodiment provides a method for using a connector. In this method, the connector comprises a first end joinable with an anchor, a second end, means for joining a cable to the connector disposed at the second end, and an extension that facilitates joining of the cable and the connector. The method comprises the steps of applying the anchor to a support surface and joining the first end and the anchor. A tool that moves the cable in proximity to the means for joining is connected with the extension. The tool is activated to bring the cable closer to the means for joining. A portion of the cable is inserted into the means for joining the cable to the connector.

A further embodiment provides a connector comprising a first end and a second end. Means for joining a cable to the connector is disposed at the second end. An extension is disposed substantially between the first end and the second end for facilitating juncture of the cable and the connector.

BRIEF DESCRIPTION OF DRAWINGS

FIG. 1 is a front elevation view of one embodiment of a connector described herein;
FIG. 2 is a sectional view taken along line A-A of FIG. 1;
FIG. 3 is a sectional view taken along line C-C of FIG. 1;
FIG. 4 is a sectional view taken along line D-D of FIG. 1.

DETAILED DESCRIPTION

Embodiments of a connector, along with methods of making a connection, are disclosed herein It is to be recognized that elements of one embodiment may be combined with elements of another embodiment to create yet an additional embodiments of the connector. Further, steps of one method of using a connector can be mixed with steps of another method of using a connector to arrive at another method of using a connector. Also, steps of a method may be performed in any appropriate order.

FIG. 1 shows one embodiment of a connector 10. The connector 10 may be used to join a cable (not shown for clarity) to an anchor 12 (shown in dotted lines) that is operatively associated with a support surface, earth; however, other media, such as concrete, are within the scope of the disclosed embodiments. It is to be understood that cable includes a wire, a strand, a belt, a braid, a strap, combinations thereof and other suitable structures. The anchor 12 is provided with an exposed end and a non-exposed end.

The connector 10 is fabricated from a cast metal, such as cast steel or cast iron. The connector 10 is cast through use of a sand mold. The preferred embodiment is fabricated through use of lost-form casting methods, such as lost-wax casting or Styrofoam casting. Alternatively, however, the connector 10 can be fabricated through heating the metal material and forging features, such as the extension 30 (which is hereinafter described). In this embodiment, the casting is substantially free of burs, seams, flashes and sharp edges and has a weight of about 7.35 lbs.

Figure 7:
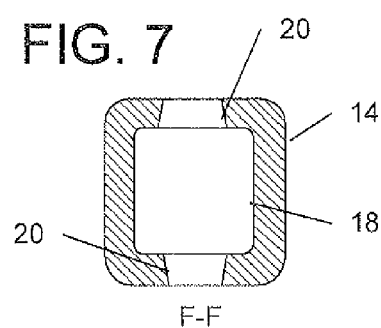
FIG. 7 is a sectional view taken along line F-F of FIG. 1.

The connector 10 has a first end 14 and a second end 16. The first end 14 has an opening 18 configured to accept a portion of the anchor 12, viz. the configuration of the opening 18 mirrors a corresponding configuration of a relevant portion of the anchor 12. For example, in the embodiment illustrated in FIG. 7, the opening 18 has a substantially polygonal latitudinal cross section and the relevant portion of the anchor 12 also has a substantially polygonal latitudinal cross section. The opening 18 is configured to retain at least a portion of the exposed end of the anchor 12. In this manner, a substantially tight fit is provided between the connector 10 and the anchor 12.

Figure 5:
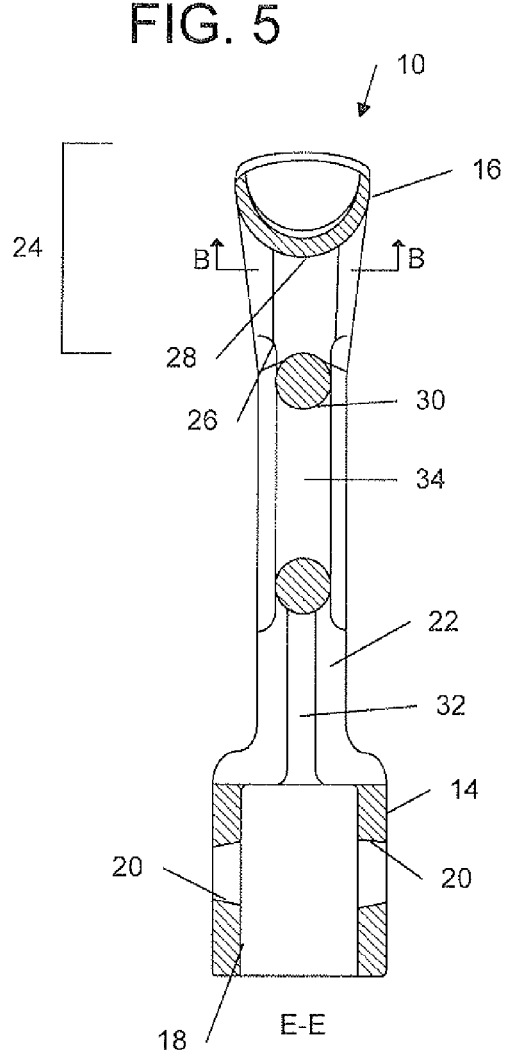
FIG. 5 is a sectional view taken along line E-E of FIG. 1.

A port 20 is disposed on the first end 14 in communication with the opening 18. The port 20 may be present at only a single surface of the first end 14 or may be present at multiple surfaces of the first end 14, a shown in FIGS. 5 and 7. The port 20 may be used to accept a fixing member, such as a set screw, a bolt and the like, to substantially fix the connector 10 with respect to the anchor 12. The port 20 is configured to couple together the connector 10 and the exposed end of the anchor 12. In some embodiments, the anchor 12 may include a bore that mates with the port 20 so that the fixing member can extend from a first surface of the first end 14, through the port 20, through the bore in the anchor 12, through the port 20 disposed opposite to the first surface of the first end 14.

A spacer 22 extends between the first end 14 and the second end 16. The spacer 22 may be of any suitable configuration, such as a substantially cylindrical configuration, a substantially polygonal configuration, a combination of these configurations or the like. The spacer 22 may extend substantially linearly between the first end 14 and the second end 16.

The second end 16 comprises a guying portion that is dimensioned to accept at least a portion of a cable. In some embodiments, means for joining the cable, not shown for clarity, to the connector 10 is disposed at the second end 16. The means 24 for joining may be of any form suitable for facilitating juncture of the cable with the connector 10. The illustrated embodiment is intended for use with a cable in the form of a cable. To accommodate that form of the cable, the means 24 includes an aperture 26 bounded at one side by at least one ridge 28. The aperture 26 has dimensions sufficient for admit a portion of the cable. The at least one ridge 28 is disposed for supporting a portion of the cable so that force can be transmitted between the connector 10 and the cable. In another embodiment, the means may be a hook.

An extension 30 is disposed adjacent the spacer 22 substantially proximate to the second end 16. The extension 30 facilitates joining of the cable and the connector 10. As the figures depict, the entire connector 10, including the first end 14, the second end 16, the spacer 22 and the extension 30, is formed as a single, unitary piece. This single, unitary piece connector 10 is distinguished from the two-piece arrangements that are currently available. Because the connector 10 is a single, unitary piece, assembly complications are reduced compared to those associated with the two-piece arrangements. Also, the single, unitary piece connector 10 does not have a bolt and nut joint that can fail.

In the illustrated embodiment, the extension 30 extends substantially coaxially with the spacer 22 such that one end of the extension 30 is disposed adjacent the second end 16 and an opposite end of the extension 30 is disposed substantially adjacent a longitudinal midpoint of the spacer 22. A reinforcement 32 extends between the extension 30 and the first end 12. A notch 34 for accepting a portion of a tool that brings a portion of the cable in proximate relation to the means 24 for joining the cable to the connector 10 is formed by the extension 30. In another embodiment, the extension 30 is a hook.

Figure 6:
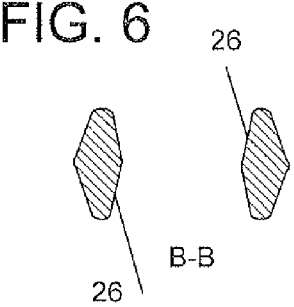
FIG. 6 is a sectional view taken along line B-B of FIG. 5.

An exemplary embodiment of the connector 10 is dimensioned as follows. Of course, other embodiments of the connector 10 may have different dimensions. The connector 10 is about 11 inches in length. A distance between an end of the at least one ridge 28 proximate to the extension 30 and a midpoint of the port 20 measures about 8.281 inches. A distance between a midpoint of the port 20 and a terminal end of the first end 14 measures about 1.375 inches. A distance between a midpoint of the notch 34 and a midpoint of the port 20 measures about 5.224 inches. A depth of the opening 18 measures about 2.563 inches. A distance between a juncture between the first end 14 and the spacer 22 and a midpoint of the port 20 is about 2.000 inches. Outer sides of the first end 14 measure about 2.438 inches wide and inner sides of the first end 14 measure about 1.625 inches wide. The second end 16 is about 2.875 inches wide. A distance between a terminal edge of the second end 16 and an end of the extension 30 adjacent the second end 16 is about 2.687 inches. Portions of the second end 16 shown in FIG. 2 are about 1.875 inches thick at the at least one ridge 28 and about 1.625 inches thick between adjacent ridges 28. Portions of the second end 16 shown in FIG. 6 are about 0.625 inches wide with interior sides offset by about 1.625 inches and exterior sides are about 2.875 inches apart. The extension 30 has a diameter of about 0.75 inches. The reinforcement 32 is about 0.375 inches wide and a distance between a longitudinal centerline of the spacer 22 and an outer edge of the reinforcement 32 is about 1.0 inch.

In another embodiment of the connector 10, the spacer 22 and reinforcement 32 are substantially reduced or removed. In an additional embodiments the anchor 12 is integral with the connector 10. In this embodiment, the anchor 12 extends directly from the first end 14. It is important to recognize that, in each embodiment, the connector 10 is a single, unitary piece.

With the structure of the connector 10 being disclosed, methods of using a connector are discussed below. It is to be recognized that further attributes of the connector 10 and its construction may become apparent upon review of the discussion of methods of using the connector 10. The method steps described below may be performed in any appropriate manner.

In one utilization of the connector 10, an anchor 12 is applied to a support surface, such as ground and the like. In some cases, the anchor 12 may have a thread-like construction so application of the anchor 12 to the support surface comprises engagement of the thread-like construction with the support surface, i.e., the anchor 12 is screwed into the support surface. The anchor 12 includes a projection having a configuration that mirrors a corresponding configuration of the opening 18 in the first end 14 of the connector 10. After application of the anchor 12 to the support surface, the connector 10 is joined with the anchor 12. Specifically, the connector 10 is positioned with respect to the anchor 12 such that the projection on the anchor 12 is accepted in the opening 18 of the first end 14 of the connector 10. An appropriate fastener, such as a bolt, a set screw and the like, is inserted into the port 20 of the first end 14 of the connector 10. The fastener sufficiently couples the connector 10 with the anchor 12. The connector 10 is ready to be joined with a cable, such as a cable and the like.

A tool, such as a come along winch and the like, can be used to facilitate joining of the connector 10 with the cable, viz. the tool moves the cable in proximity to the means 16 for joining. A portion of the tool is connected with the extension 30. The portion of the tool, such as a hook, can be inserted into the notch 34 to facilitate force transfer between the tool and the connector 10. An opposite portion of the tool is connected with the cable. The tool is activated to bring the cable closer to the second end 16 of the connector 10. As the tool draws the cable towards the second end 16, force is transmitted among the cable, the tool, the connector 10 and the anchor 12. Once the cable is in sufficiently close proximity to the second end 16, a portion of the cable is inserted in the aperture 26 of the means 24 for joining the cable to the connector 10. The at least one ridge 28 facilitates retention of the portion of the cable in the means 24 for joining the cable to the connector 10.

Once the portion of the cable is joined with the connector 10, the tool can be disconnected from the cable and the extension 30 of the connector 10. At this time, the connector 10 transmits force between the cable and the anchor 12. The process of joining cables and the connector 10 can be repeated. Depending on the construction of the cable, the means 24 for joining the cable to the connector 10 may accommodate multiple cables.

What is claimed is:

1. A connector for joining a cable with an anchor that is provided with an exposed end and a non-exposed end, the connector comprising:
   (a) a first end;
   (b) a second end;
   (c) a spacer extending between the first end and the second end;
   (d) an opening disposed at the first end that is provided with a generally polygonal cross-sectional shape and configured to retain at least a portion of the exposed end of the anchor;
   (e) located on the first end, a port that accepts a fixing member and that is configured to couple together the connector and the exposed end of the anchor;
   (f) a guying portion located at the second end that is dimensioned to accept at least a portion of a cable;
   (g) an extension generally located adjacent to the guying portion of the second end and shaped to retain a hook of a come-along winch; and (h) the connector is a single, unitary piece of cast metal.

2. The connector as defined in claim 1 wherein the connector is made from at least one of a metal and an alloy of metal.

3. The connector as defined in claim 1 wherein the connector is made by at least one of casting, swaging, and cold forming.

4. The connector as defined in claim 1 wherein the extension extends substantially coaxially with the spacer such that one end of the extension is disposed adjacent the second end and an opposite end of the extension is disposed substantially adjacent a longitudinal midpoint of the spacer.

5. The connector as defined in claim 1 further comprising:
(i) a notch formed by the extension.

6. The connector as defined in claim 1 further comprising:
(j) a reinforcement extending between the extension and the first end.

* * * * *